United States Patent [19]

Bibette et al.

[11] Patent Number: 5,242,964
[45] Date of Patent: Sep. 7, 1993

[54] PROCESS FOR THE PREPARATION OF AQUEOUS DISPERSIONS OF MAGNETIZABLE POLYMER PARTICLES WITH A DESIRED SIZE NARROW DISTRIBUTION, AND AQUEOUS DISPERSIONS THEREOF, AND USES THEREOF

[75] Inventors: Jerome Bibette, Gradignan; Dominique Charmot, Paris; Gilbert Schorsch, Colombes, all of France

[73] Assignee: Rhone-Poulenc Chimie, Courbevoie, France

[21] Appl. No.: 737,084

[22] Filed: Jul. 29, 1991

[51] Int. Cl.$^5$ .................. A61K 9/50; C08F 12/02; C08F 2/44; C08L 83/04; C08K 3/08; B01J 13/02; B01J 13/12; G01N 33/545

[52] U.S. Cl. .................... 524/376; 524/556; 524/567; 524/568; 524/571; 524/577; 524/804; 523/205; 523/206; 525/54.1; 526/217; 526/292.3; 526/274; 526/286; 526/287; 526/302; 526/310; 526/311; 526/317.1; 252/62.54; 428/402; 428/403; 428/405; 435/176; 435/180; 435/188; 436/527; 530/812; 530/815

[58] Field of Search .............. 524/376, 556, 567, 568, 524/571, 577, 804; 523/205, 206; 525/54.1; 526/302, 310, 311, 217, 292.3, 274, 286, 287, 317.1; 252/62.54; 428/402, 403, 405; 435/176, 180, 188; 436/807, 527; 530/812, 815

[56] References Cited

U.S. PATENT DOCUMENTS

| | | | |
|---|---|---|---|
| 4,177,253 | 12/1979 | Davies et al. | 436/527 |
| 4,358,388 | 11/1982 | Daniel et al. | 252/62.54 |
| 4,554,088 | 11/1985 | Whitehead et al. | 436/527 |
| 4,952,622 | 9/1990 | Chauvel et al. | 524/376 |
| 5,034,145 | 7/1991 | Leising et al. | 252/62.54 |

FOREIGN PATENT DOCUMENTS

| | | |
|---|---|---|
| 0038730 | 10/1981 | France . |
| 0299846 | 7/1988 | France . |
| 0291389 | 11/1988 | France . |
| 1416004 | 12/1975 | United Kingdom . |

*Primary Examiner*—Nathan M. Nutter
*Attorney, Agent, or Firm*—Finnegan, Henderson, Farabow, Garrett & Dunner

[57] ABSTRACT

A process for the preparation of aqueous dispersions of magnetizable polymer particles with a narrow distribution from aqueous dispersions with a wide distribution. The amount of water in the aqueous dispersion with a wide distribution is adjusted so that the proportion by weight of magnetizable polymer particles is between about 1 and 40% of said dispersion. The surfactant concentration of the dispersion after the water adjustment is increased until two phases are obtained: a so-called liquid phase and a so-called solid phase. After separation of these two phases is accomplished, these steps are repeated as desired. An aqueous dispersion with a narrow size distribution is recovered.

20 Claims, 3 Drawing Sheets

PROCESS FOR THE PREPARATION OF AQUEOUS DISPERSIONS OF MAGNETIZABLE POLYMER PARTICLES WITH A DESIRED SIZE NARROW DISTRIBUTION, AND AQUEOUS DISPERSIONS THEREOF, AND USES THEREOF

The present invention relates to a process for the preparation of aqueous dispersions having a narrow size distribution of magnetizable polymer particles from aqueous dispersions having a wide size distribution of magnetizable polymer particles. The present invention also relates to aqueous dispersions made by the process, and uses thereof.

Polymer particles or microspheres have been involved in the preparation of diagnostic tests of the radioimmunoassay or immunoenzymatic type. The separation and washing steps of the polymer particles are simplified when the particles are magnetizable.

The efficacy of these particles can also generally increase as their size distribution becomes narrower. A sufficiently narrower size distribution can make it possible to obtain an improved sharp sedimentation front and a supernatant phase devoid of fine particles, while at the same time limiting the sedimentation phenomenon due to larger particles.

A relatively narrower size distribution (monodispersity) can also improve determination of the exact adsorption area of the microspheres and hence their optimum binding capacity with respect to antigens or antibodies.

In a quite different application, suspensions of magnetizable polymer particles have been used as the base for magneto-thickening fluids. Again, improved performance characteristics can generally be achieved when the magnetizable particles have a narrower size distribution.

Aqueous dispersions of magnetizable polymer particles having a wide size distribution are known. For example, European Patent No. 38730 describes a process for the preparation of magnetizable polymer lattices which consists of dispersing the magnetic charge in an organic phase containing an organosoluble initiator and/or the monomer(s), mixing the dispersion with an aqueous solution made up of water and emulsifier, homogenizing the mixture to give droplets of organic phase with a size of between 0.03 and 5 microns, and finally polymerizing the homogenized mixture after the addition of monomer(s), if necessary. The homogenization of the mixture can be carried out in a high-shear homogenizer (for example, a colloid mill).

The size of the final particles corresponds to that of the resulting droplets. The distribution of the droplets (and hence of the polymer particles) is a function of the proportion of emulsifier present in the aqueous solution, and the ratio of the organic phase to the aqueous phase. The size distribution of the polymer particles obtained by this process is generally wide.

For illustrative purposes of this application, the particle size distribution will be considered "wide" if, in terms of a Gaussian distribution with a median diameter of 1 micron, the relative standard deviation of the distribution is of the order of 60%. In other words, about ⅔rds by weight of the particles have a diameter of between 0.4 and 1.6 microns. Correspondingly, for illustrative purposes of this application, any size distribution whose standard deviation is less than or equal to 30%, and preferably of the order of 15 to 25%, will be considered to be "narrow."

One objective of the present invention is to ameliorate disadvantages of known aqueous dispersions of magnetizable polymer particles having a wide size distribution by providing aqueous dispersions having narrow size distributions where the standard deviation is less than or equal to 30%, preferably in the range of 15 to 25%, and more preferably in the range of 3 to 5%.

Figure 1:
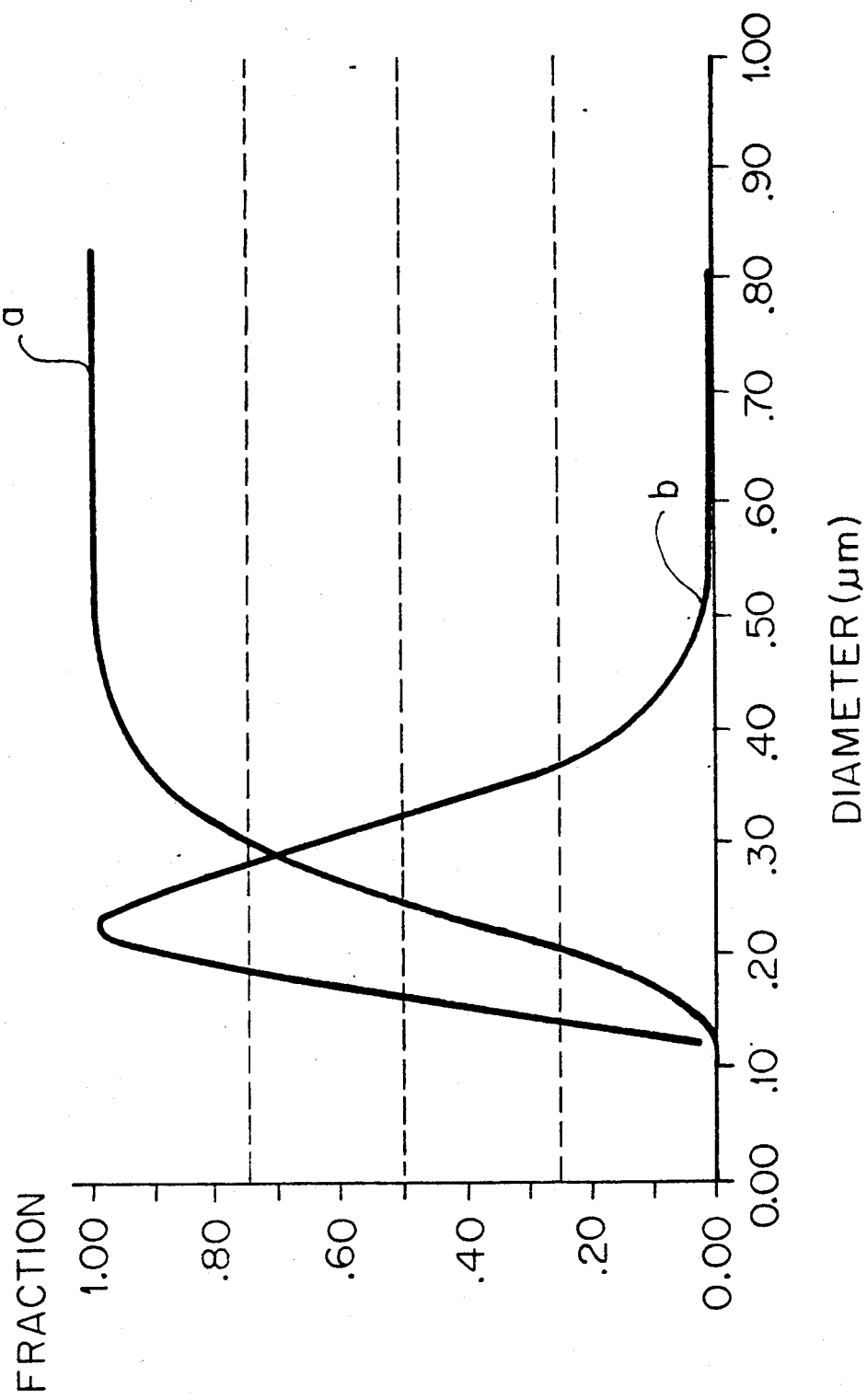
FIG. 1 is a size distribution curve for magnetic particles wherein curve (a) represents the cumulative weight distribution curve and curve (b) represents the weight distribution curve.

In accordance with one embodiment of the invention, a process for preparation of aqueous dispersions of magnetizable polymer particles with a narrow size distribution from aqueous dispersions with a wide size distribution is provided. The process comprises the following steps:

First (or "step (a)"), the amount of water in the aqueous dispersion containing magnetizable polymer particles with a wide size distribution is adjusted, if necessary, so that the proportion by weight of particles (solids content) is in the range of about 1 to 40%, preferably in the range of about 4% to 15%, of the dispersion. Second (or "step (b)"), the surfactant concentration of the dispersion obtained in step (a) is increased until two phases are obtained: (1) a so-called liquid or fluid phase in which the particles are relatively free, and (2) a so-called solid phase in which the particles are relatively associated. Third (or "step (c)"), these two phases are separated.

Thereafter (or "step (d)"), these first, second and third steps may be repeated on the solid phase, if appropriate, as many times as is necessary to obtain an aqueous dispersion with the desired size distribution.

The aqueous dispersion with the desired, narrow distribution is recovered and diluted, if appropriate, to give the desired solids content (or "step (e)").

The resulting aqueous dispersion has a standard deviation of the size distribution of the particles that is less than or equal to 30%, preferably in the range of about 15 to 25%, and more preferably in the range of about 3 to 5%.

The starting aqueous dispersion with a wide distribution can contain magnetizable particles with a size distribution on the range from about 0.01 to 20 microns, preferably 0.1 to 3 microns. The magnetizable particles can contain from 0.5 to 70% by weight of a magnetic charge.

The surfactant introduced in step (b) is anionic, cationic, amphoteric or non-ionic, or compatible mixtures thereof. The amount of surfactant is preferably 2.5 to 20 times the critical micellar concentration, more preferably 2.5 to 10 times.

Steps (a), (b) and (c) are repeated from 1 to 8 times on the fluid phase and/or the solid phase, preferably from 2 to 5 times.

In another embodiment of the invention, aqueous dispersions having a narrow size distribution of particles can be provided where the standard deviation of the size of the particles is less than or equal to 30%. The standard deviation can also be in the range of 15 to 25%, and in the range of 3 to 5%.

In accordance with another embodiment of the invention, the use of the aqueous dispersions prepared in accordance with this process in the preparation of diagnostic tests of the radioimmunoassay or immunoenzymatic types is provided.

In accordance with another embodiment of the invention, a magneto-thickening fluid incorporating the aqueous dispersion produced by the process of the invention is provided.

The invention will now be discussed in greater detail, to complement the discussion set forth above. The starting aqueous dispersions with a wide size distribution can be prepared by any known process. For example, these starting aqueous dispersions are described in European Patent No. 38730, French Patent Application No. 89,04231 filed Mar. 31, 1984 and the French Patent Application Nos. 2,618,084 and 2,624,873. The techniques of synthesis of the starting aqueous dispersions of the present invention are generally known. Thus, it is within the ordinary skill of the art to produce any starting aqueous dispersion disclosed herein by employing as paradigms, for example, the processes in these referenced documents and the examples given in the remainder of the discussion.

The size distribution of the particles of the starting aqueous dispersions can be in the range of 0.01 to 20 microns, and preferably in the range of 0.1 to 3 microns.

The polymers from which the magnetizable particles can be made include organopolysiloxanes, as well as polymers derived from monomer(s) immiscible with water (i.e., with a solubility in water of less than about 5% by weight).

Monomers which are preferred are, for example, vinylaromatic monomers (styrene, vinyltoluene etc.), alkyl esters of $\alpha, \beta$-unsaturated acids (methyl acrylates, ethyl acrylates, methacrylates and the like), unsaturated carboxylic acid esters (vinyl acetate and the like), vinyl chloride, vinylidene chloride, dienes (butadiene and the like), and monomers containing nitrile groups (acrylonitrile and the like).

The monomer composition from which the polymer is derived can additionally contain up to about 10% of its weight (preferably up to 4% of its weight) of at least one monomer carrying ionic or reactive groups such as:

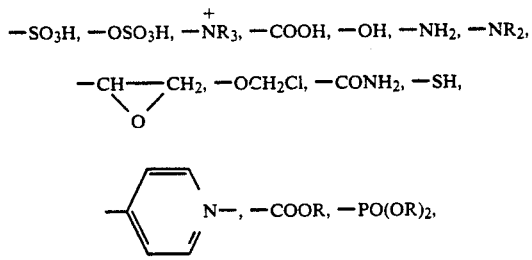

R being a $C_1$-$C_4$, preferably $C_1$-$C_2$, alkyl radical.

Monomers carrying ionic or reactive groups which are preferred, for example, are vinylbenzenesulphonate, sulphoalkyl esters of unsaturated acids (2-sulphoethyl methacrylate and the like), unsaturated carboxylic acids (acrylic acid, methacrylic acid, maleic acid, itaconic acid and the like), hydroxyalkyl acrylates or methacrylates (hydroxyethyl acrylate, hydroxypropyl acrylate and the like), aminoalkyl esters of unsaturated acids (2-aminoethyl methacrylate and the like), acrylamide, vinylbenzyl chloride, and glycidyl methacrylate.

The magnetizable polymer particles can contain in the range of 0.5 to 70% by weight, preferably 5 to 60% by weight, of a magnetic charge whose size is less than 1 micron and preferably between 0.002 and 0.02 microns. The magnetic charge is sufficiently fine to be able to be included in the polymer particles.

This magnetic charge can preferably consist of, for example, metals or their alloys, such as iron, siliceous iron, nickel, cobalt, samarium or their alloys with molybdenum, chromium, copper, vanadium, manganese, aluminum, titanium, neodymium and the like; iron oxides: $Fe_3O_4$ or $\gamma$-$Fe_2O_3$, pure, combined with one another or mixed with other oxides such as the oxides of cobalt, manganese, zinc, barium and rare earths; and chromium dioxide.

The solids content of the starting aqueous dispersions with a wide distribution can be less than 65% by weight and generally is in the range of 5 to 30% by weight.

The proportion of surfactant in the starting aqueous dispersions with a wide distribution can be in the range of 0.1 to 2 times the critical micellar concentration ("CMC"). The CMC is defined as the surfactant concentration necessary for the appearance of the first surfactant aggregates, called micelles. These surfactants, which give the dispersion its stability, can be anionic, cationic, amphoteric or non-ionic.

Among the anionic surfactants which are preferred, for example, are alkali metal alkylbenzenesulphonates, alkali metal alkylsulphates such as sodium dodecylsulphate, alkali metal alkylether-sulphates, alkali metal alkylaryl-ether-sulphates and alkali metal dioctylsulphosuccinates.

Among the cationic surfactants which are preferred, for example, are dialkyl ($C_{10}$-$C_{30}$)benzyldimethylammonium halides and polyethoxylated quaternary ammonium salts.

Among the amphoteric surfactants which are preferred, for example, are N-alkyl($C_{10}$-$C_{22}$)betaines, N-alkyl($C_{10}$-$C_{22}$)amidobetaines, alkyl($C_{10}$-$C_{22}$)imidazolines and asparagine derivatives.

Among the non-ionic surfactants which are preferred, for example, are polyethoxylated fatty acids, sorbitan esters, polyethoxylated sorbitan esters, polyethoxylated alkylphenols, polyethoxylated fatty alcohols, polyethoxylated or polyglycerolated fatty amides and polyglycerolated alcohols and alpha-diols.

With these starting aqueous dispersions, the process of the invention can be undertaken. First (or "step (a)"), the amount of water in the aqueous dispersion with a wide size distribution is adjusted, if necessary, so that the proportion by weight of magnetizable polymer particles (solids content) is in the range of about 1 to 40%, preferably in the range of about 4 to 15%, of the dispersion.

Second (or "step (b)"), the surfactant concentration of the dispersion obtained in step (a) is increased until two phases are obtained: (1) a so-called liquid or fluid phase in which the particles are relatively free, and (2) a so-called solid phase in which the particles are relatively associated. The amount of surfactant to be introduced in step (b) is the amount which is necessary to obtain two phases. To obtain such a decantation of two phases, it is generally sufficient to add to the dispersion obtained in step (a) an amount of surfactant such that the surfactant concentration ranges from 2.5 to 20 times the CMC, preferably from 2.5 to 10 times the CMC.

The surfactant used can be the same as those in the starting dispersion or any surfactant compatible with the starting surfactant(s). Examples of surfactants have been given above.

Third (or "step (c)"), the two phases are separated. The two phases can be separated by any means, such as by pumping, suction, or any other appropriate separation means. The decantation can be accelerated, if appropriate, by a magnetic field.

Thereafter (or "step (d)"), the first, second and third steps may be repeated on the separated solid phase, if appropriate, as many times as is necessary to obtain an aqueous dispersion with the desired narrow size distribution. In general, this result is achieved by repeating the first three steps from 1 to 8 times (more generally from 2 to 5 times) on the solid phase.

After an aqueous dispersion with the desired size distribution is obtained, the aqueous dispersion with the desired narrow size distribution is recovered and diluted, if appropriate, to give the desired solids content (or "step (e)").

If appropriate, the solid phase can also be homogenized and diluted with water to give a single-phase dispersion in which the particles are well separated.

The solid phase(s) separated off in this way by the process of the invention should yield an increasingly narrow distribution. The resulting aqueous dispersion can have a standard deviation of the size distribution of the particles that is less than or equal to 30%, preferably in the range of 15 to 25%, and more preferably in the range of 3 to 5%. However, the invention should not be considered limited to these latter two ranges as the only ranges being less than or equal to 30%; specifically, intermediate and other ranges are possible.

The particle size of the solid phase can be measured, for example, by optical microscopy or with the aid of adapted granulometers. The narrowness of the distribution can be evaluated by means of the degree of polydispersity. The solid phases generated by increasing surfactant concentrations will generally consist of smaller and smaller particles. This is a consequence of the action of the surfactant and constitutes the basis of the process.

Alternatively, the liquid phase recovered in the step (c) can be considered the starting aqueous dispersion of the step (a), but devoid of the particle population recovered in the solid phase. Consequently, the steps (a), (b) and (c) of the process can be applied at least once to this liquid phase to obtain the desired size distribution. In general, this result is achieved by repeating the first three steps from 1 to 8 times (more generally 2 to 5 times) on the liquid phase.

The aqueous dispersions by the process of the invention can be used for the same applications that the aqueous dispersions having a wide size distribution can be used. These uses include the preparation of diagnostic tests of the radioimmunoassay or immunoenzymatic type, and in magneto-thickening fluids.

To illustrate the nature of the invention, the following examples are given. It should be understood, however, that the invention is not to be limited to the specific conditions or details set forth in the examples.

EXAMPLE 1

The aqueous dispersion of magnetic polymer microspheres which were treated in the present Example is marketed by Rhone-Poulenc under the reference ESTAPOR ® M1-180/12. The magnetic microspheres are composite particles consisting of polystyrene and magnetic oxide. The proportion of magnetic oxide is of the order of 12% by weight. The particle size distribution is polydispersed with diameters typically of between 0.1 micrometers and 5 micrometers and with about 70% by weight of the microspheres having a diameter of between 1 micrometer and 3 micrometers. The weight-average size is of the order of 1.8 micrometers.

First, the dispersion was diluted with deionized water to bring the proportion of particles to about 5% (by weight).

Second, sodium laurylsulphate (SLS), a surfactant, was then added in a sufficient amount for the SLS concentration of the dispersion ($C_1$) to be 0.02 mol/liter.

Third, the dispersion was left to stand for about 15 hours, after which time separation of the solid and liquid phases was observed. The solid phase was decanted at the bottom of the container and the liquid phase was gently sucked off.

As soon as the third step was complete, the recovered liquid phase was re-treated as in the second step. The SLS concentration ($C_2$) was increased to 0.04 mol/liter. This was then followed by the third step as before.

The cycle of the second and third steps were repeated a further two times on the liquid phase to give an SLS concentration ($C_4$) of 0.08 mol/liter.

The solid phase recovered at the end of this last operation was then redispersed in distilled water. The size distribution of the magnetic particles was analyzed with the aid of a Brookhaven ® DCP 1000 centrifugal photosedimentometer marketed by Brookhaven Inst. Corp.

The size distribution curve is shown in FIG. 1. Curve (a) represents the cumulative weight distribution curve and curve (b) represents the weight distribution curve.

These curves illustrate that the weight-average diameter of the particles is 0.26 microns with a standard deviation of 0.071 microns; and the degree of polydispersity is 27% (as opposed to 55% for the starting dispersion).

Figure 2A:
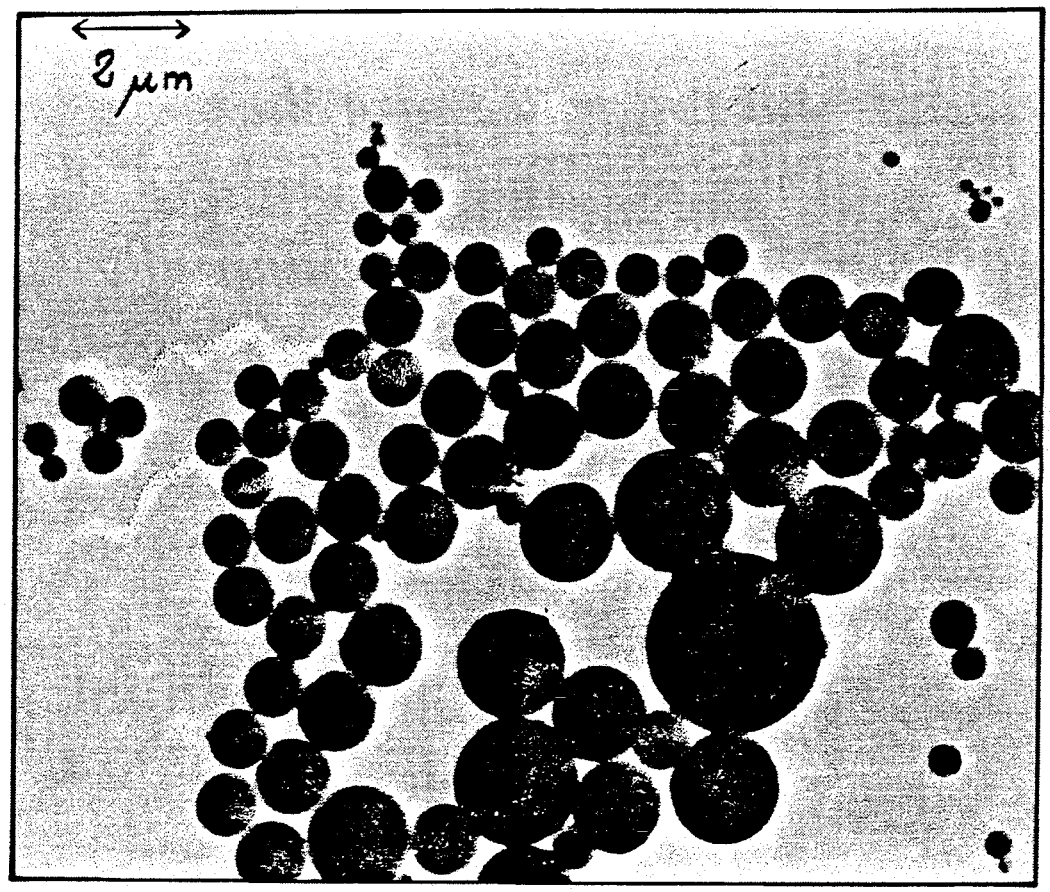
FIGS. 2a and 2b set forth particle size distributions which are compared by transmission electron microscopy before fractionation (FIG. 2a) and after fractionation (FIG. 2b).
Figure 2B:
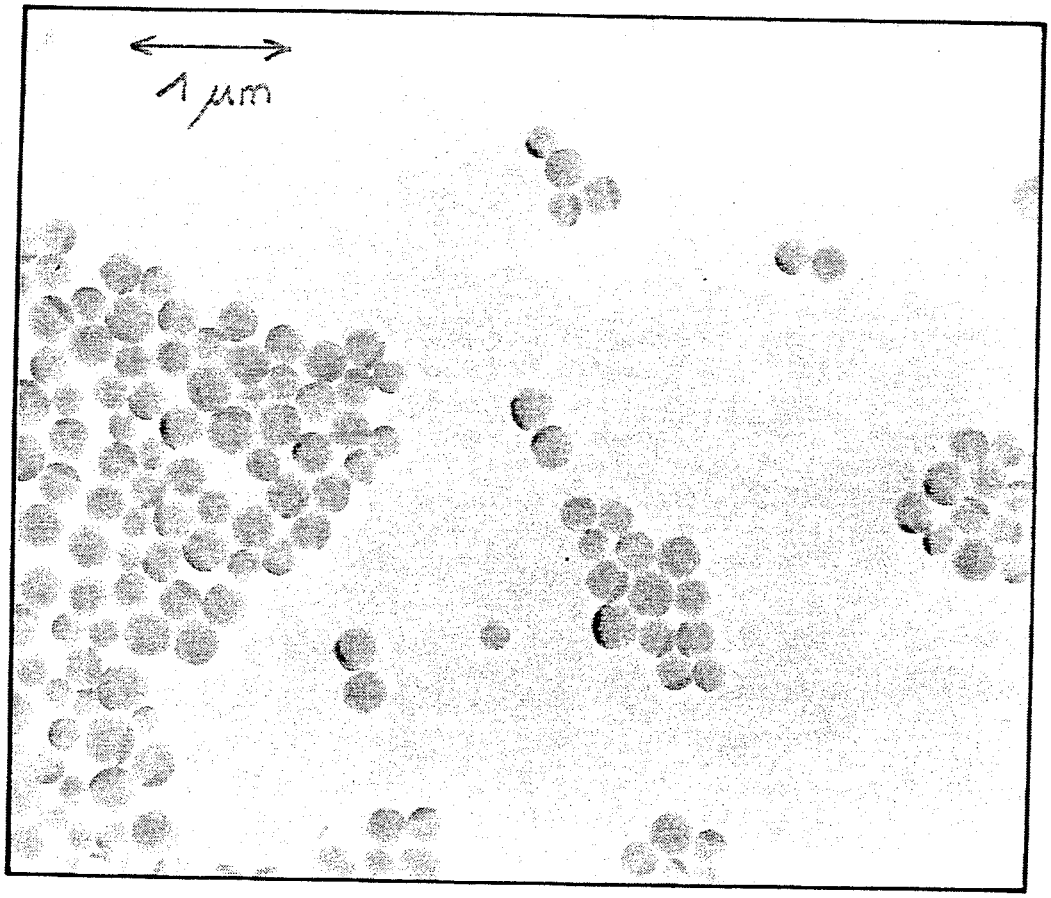

FIG. 2, in which the particle size distributions are compared by transmission electron microscopy before fractionation (FIG. 2a) and after fractionation (FIG. 2b), illustrates the efficacy of the process of separation and narrowing of the particle size distribution.

EXAMPLE 2

In this Example, the aqueous dispersion of magnetic microspheres which were treated had the reference ESTAPOR ® M1-070/60. The proportion of magnetic oxide was of the order of 60% by weight. The particle size distribution was dispersed with diameters typically of between 0.05 micrometer and 3 micrometers and with about 70% by weight of the microspheres having a diameter of between 0.3 micrometer and 1 micrometer. The weight-average size was of the order of 0.7 micrometer.

A cycle of the first, second and third steps, similar to that of Example 1, was performed and then repeated 2 times on the liquid phase to give an SLS concentration ($C_3$) of 0.06 mol/liter.

The recovered solid phase was redispersed at a solids content of the order of 5% by weight. SLS was added up to a concentration of 0.05 mol/liter.

The suspension was left to stand for 15 hours and the decanted solid phase was recovered and redispersed in distilled water; the size distribution of the magnetic particles was analyzed with the aid of a Brookhaven ® DCP 1000 centrifugal photosedimentometer. The degree of polydispersity was estimated at 35% (as opposed to 50% for the starting dispersion).

SLS was next added to the dispersion recovered at the end of the treatment obtained thus far up to a concentration of 0.06 mol/liter. The third step of Example 1 was then carried out. The solid phase was recovered and treated in accordance with the first and second steps of Example 1 at an SLS concentration of 0.06 mol/liter, and the third step was then carried out as before in order to recover a solid fraction. This appeared irridescent after 48 hours and had the characteristic of diffracting visible light (violet, green and red colors). This was an obvious indication that the fractionated sample of particles had formed colloidal crystals. These colloidal crystals can only be formed when their constituent particles possess a particularly narrow or even monodisperse size distribution. This illustrated that the process of the invention provided a dispersion of microspheres with a narrower size distribution from a dispersion of microspheres with a wide size distribution.

What is claimed is:

1. A process for the preparation of an aqueous dispersion of magnetizable polymer particles having a narrow size distribution from an aqueous dispersion of said particles having a wide size distribution, comprising the steps of:
   (a) providing an aqueous dispersion having a wide size distribution of magnetizable polymer particles and having a solids content by weight of polymer particles in the range of from about 1 and 40%, said wide size distribution of polymer particles having a standard deviation of about 60% or more;
   (b) adding a surfactant to the dispersion of step (a) until two phases are obtained, said two phases constituting a liquid phase which is relatively free of said particles, and a solid phase in which said particles are relatively associated therein;
   (c) separating said two phases obtained in step (b); and
   (d) optionally repeating step (a), (b) and (c) on said solid phase separated in step (c) at least once to provide an aqueous dispersion having a narrow size distribution of polymer particles having a standard deviation less than or equal to 30%.

2. The process of claim 1, further comprising the step of:
   (e) diluting said aqueous dispersion with said narrow size distribution to provide a desired solids content.

3. The process of claim 1, wherein said standard deviation is in the range of 15 to 25%.

4. The process of claim 3, wherein said standard deviation is in the range of 3 to 5%.

5. The process of claim 1, wherein said aqueous dispersion with a wide size distribution contains magnetizable particles with a size distribution in the range from 0.01 to 20 microns.

6. The process of claim 1, wherein said magnetizable polymer particles in step (a) contain in the range of 0.5 to 70% by weight of a magnetic charge.

7. The process of claim 1, wherein step (a), the solids content by weight of said magnetizable polymer particles having a narrow size distribution ranges from 4 to 15% of said aqueous dispersion.

8. The process of claim 1, wherein the surfactant introduced in step (b) to increase said surfactant concentration is selected from anionic, cationic, amphoteric or nonionic surfactants, or compatible mixtures thereof.

9. The process of claim 1, wherein the surfactant concentration introduced in step (b) is increased to the range from 2.5 to 20 times the critical micellar concentration.

10. The process of claim 9, wherein the surfactant concentration in step (b) is increased to the range from 2.5 to 10 times the critical micellar concentration.

11. The process of claim 1, wherein said steps (a), (b) and (c) are repeated up to 8 times on the solid phase separated in step (c).

12. The process of claim 11, wherein said steps (a), (b) and (c) are repeated from 2 to 5 times on the solid phase separated in step (c).

13. The process of claim 1, further comprising the step of repeating steps (b) and (c) up to 8 times on the liquid phase separated in step (c).

14. The process of claim 13, wherein said steps (b) and (c) are repeated from 2 to 5 times on the liquid phase separated in step (c).

15. An aqueous dispersion comprising a narrow size distribution of magnetizable polymer particles as produced by the process of claim 1, wherein the standard deviation of the narrow size distribution of said particles is less than or equal to 30%.

16. The aqueous dispersion of claim 15, wherein said standard deviation is in the range from 15 to 25%.

17. The aqueous dispersion of claim 16, wherein said standard deviation is in the range from 3 to 5%.

18. A process comprising the step of using an aqueous dispersion of magnetizable polymer particles having a narrow size distribution as produced by the process of claim 1, wherein the standard deviation of the size distribution of said particles is less than or equal to 30%, in a diagnostic test of the radioimmunoassay or immunoenzymatic type.

19. A magneto-thickening fluid comprising an aqueous dispersion of magnetizable polymer particles having a narrow size distribution as produced by the process of claim 1, wherein the standard deviation of the size distribution of said particles is less than or equal to about 30%.

20. A diagnostic test of the radioimmunoassay or immunoenzymatic type comprising an aqueous dispersion of magnetizable polymer particles having a narrow sizes distribution as produced by the process of claim 1, wherein the standard deviation of the size distribution of said particles is less than or equal to 30%.

* * * * *